United States Patent
Ranjan et al.

(10) Patent No.: US 11,075,887 B2
(45) Date of Patent: Jul. 27, 2021

(54) FEDERATING DATA INSIDE OF A TRUSTED EXECUTION ENVIRONMENT

(71) Applicant: ARM IP LIMITED, Cambridge (GB)

(72) Inventors: Karthik Ranjan, Kirkland, WA (US); Shiv Ramamurthi, Santa Clara, CA (US)

(73) Assignee: ARM IP Limited, Cambridge (GB)

( * ) Notice: Subject to any disclaimer, the term of this patent is extended or adjusted under 35 U.S.C. 154(b) by 213 days.

(21) Appl. No.: 15/407,492

(22) Filed: Jan. 17, 2017

(65) Prior Publication Data

US 2018/0115530 A1    Apr. 26, 2018

Related U.S. Application Data

(60) Provisional application No. 62/411,791, filed on Oct. 24, 2016.

(51) Int. Cl.
*H04L 29/06* (2006.01)
*G06F 21/74* (2013.01)
(Continued)

(52) U.S. Cl.
CPC .......... *H04L 63/0428* (2013.01); *G06F 21/57* (2013.01); *G06F 21/602* (2013.01); *G06F 21/74* (2013.01); *G06F 21/85* (2013.01)

(58) Field of Classification Search
CPC ... H04L 63/0428; G06F 21/602; G06F 21/74; G06F 21/85
(Continued)

(56) References Cited

U.S. PATENT DOCUMENTS 8,510,844 B2 * 8/2013 Takatsuji ................ G06F 21/10
                                                        705/51
9,491,111 B1 * 11/2016 Roth ..................... G06F 21/645
(Continued)

FOREIGN PATENT DOCUMENTS

WO    WO 2013/072177    5/2013

OTHER PUBLICATIONS

International Search Report and Written Opinion of the International Searching Authority dated Nov. 20, 2017 in PCT/GB2017/052872, 14 pages.

*Primary Examiner* — Fatoumata Traore
*Assistant Examiner* — Moeen Khan
(74) *Attorney, Agent, or Firm* — Nixon & Vanderhye P.C.

(57) ABSTRACT

There is described a method and data processing gateway comprising: data processing circuitry for performing data processing operations in response to program code; a first execution environment (FEE) and a second execution environment (SEE) for storing data and program code, wherein data and program code stored in the FEE when accessible to the data processing circuitry configured to operate in the FEE is inaccessible to the data processing circuitry when configured to operate in the SEE, the FEE comprising: a data ingestion store for receiving a device decryption mechanism into the FEE to decrypt encrypted device data, the data ingestion store further for receiving encrypted device data into the FEE and for decrypting the encrypted device data using the device decryption mechanism; and a subscriber client manager for receiving a first subscriber encryption mechanism into the FEE, and further for encrypting device data using the first subscriber encryption mechanism and further for transmitting encrypted device to a first subscriber externally of the data processing gateway whereby the device data is secure outside of the FEE.

14 Claims, 6 Drawing Sheets

(51) Int. Cl.
  *G06F 21/85* (2013.01)
  *G06F 21/57* (2013.01)
  *G06F 21/60* (2013.01)

(58) Field of Classification Search
  USPC .......................................................... 713/153
  See application file for complete search history.

(56) References Cited

U.S. PATENT DOCUMENTS

| | | | |
|---|---|---|---|
| 2012/0253852 A1* | 10/2012 | Pourfallah | G06Q 20/3276 705/4 |
| 2013/0091209 A1* | 4/2013 | Bennett | H04W 4/21 709/204 |
| 2013/0243189 A1* | 9/2013 | Ekberg | H04L 9/3297 380/44 |
| 2014/0040979 A1* | 2/2014 | Barton | H04L 63/20 726/1 |
| 2014/0075496 A1* | 3/2014 | Prakash | G06F 21/6218 726/1 |
| 2014/0281531 A1* | 9/2014 | Phegade | H04L 9/083 713/168 |
| 2016/0164867 A1* | 6/2016 | Jung | H04L 63/0861 713/186 |
| 2016/0210477 A1* | 7/2016 | Lee | H04L 63/0428 |
| 2016/0275018 A1* | 9/2016 | Chhabra | G06F 21/79 |
| 2017/0277869 A1* | 9/2017 | Liu | H04L 9/0894 |
| 2017/0337390 A1* | 11/2017 | Hamilton | H04L 9/0861 |

* cited by examiner

FEDERATING DATA INSIDE OF A TRUSTED EXECUTION ENVIRONMENT

This application claims the benefit of U.S. Provisional Application No. 62/411,791 filed Oct. 24, 2016, the entire content of which is hereby incorporated by reference.

The present techniques relate to federating data inside of a trusted execution environment (TEE).

TEE technology provides system-wide hardware isolation for trusted software found increasingly in microprocessor design. TEE creates an isolated secure world which can be used to provide confidentiality and integrity to the system. It is used on billions of microprocessors to protect high-value code and data for diverse use cases including authentication, payment, content protection and enterprise.

The TEE hardware architecture provides a security framework that enables a device to counter many of the specific threats that it will experience. Instead of providing a fixed one-size-fits-all security solution, TEE technology provides the infrastructure foundations that allow a system on a chip (SoC) designer to choose from a range of components that can fulfil specific functions within the security environment.

The primary security objective of the architecture is simple; to enable the construction of a programmable environment that allows the confidentiality and integrity of almost any asset to be protected from specific attacks. A platform with these characteristics can be used to build a wide-ranging set of security solutions which are not cost-effective with traditional methods.

The security of the system is achieved by partitioning all of the SoC's hardware and software resources so that they exist in one of two worlds: a secure world for the security subsystem; and a non-secure world for everything else. Hardware logic present in the TEE enabled fabric ensures that no secure world resources can be accessed by the non-secure world components, enabling a strong security perimeter to be built between the two. A design that places sensitive resources in the secure world, and implements robust software running on the secure processor cores, can protect almost any asset against many of the possible attacks, including those which are normally difficult to secure, such as passwords entered using a keyboard or touch-screen.

TEE hardware architecture has been implemented in a single physical processor core to safely and efficiently execute code from both the normal world and the secure world in a time-sliced fashion. This removes the need for a dedicated security processor core, which saves silicon area and power, and allows high performance security software to run alongside the normal world operating environment. Each physical processor core provides two virtual cores, one considered non-secure and the other secure, and a mechanism to robustly context switch between them. The security state is encoded on the system bus and this enables trivial integration of the virtual processors into the system security mechanism; the non-secure virtual processor can only access non-secure system resources, but the secure virtual processor can see all resources.

One implementation of TEE hardware architecture is a security-aware debug infrastructure which can enable control over access to secure world debug, without impairing debug visibility of the normal world. On application processors that support the security extensions the transition between non-secure world and secure world is managed by software via a firmware call which runs at the highest level of firmware privilege, for example, exception level 3.

A TEE comprises: hardware based isolation technology; trusted boot code; and a small trusted operating system (OS). A TEE can be used to run multiple isolated trusted applications (apps) which may be provisioned over the air. Compared to other security technologies the TEE provides higher performance and access to larger amounts of memory. Typical usage cases for a TEE include: trusted boot, integrity management, authentication, payment, content protection, crypto and mobile device management. Secure world device drivers can be used to interface to peripherals and for example used to enable trusted user interfaces. A TEE can be used alongside other security technology such as secure elements, hypervisors and security sub-systems to provide multi-layered defence. The TEE is designed to protect against software attacks (for example malware) and common physical attacks (so called "shack" attacks).

Secure resources are protected from non-secure access enabling the system designer to isolate and compartmentalize their design. Since the transitions between the two states are hardware based they are almost instantaneous and thus maintain real time performance and reduced software overhead. Writing code for the normal world remains the same as before: the application has access to privileged and non-privileged space plus interrupts. To call on libraries in the secure world, function entry points are linked into the project.

Embodiments will be described with reference to the accompanying figures of which:

Figure 1:
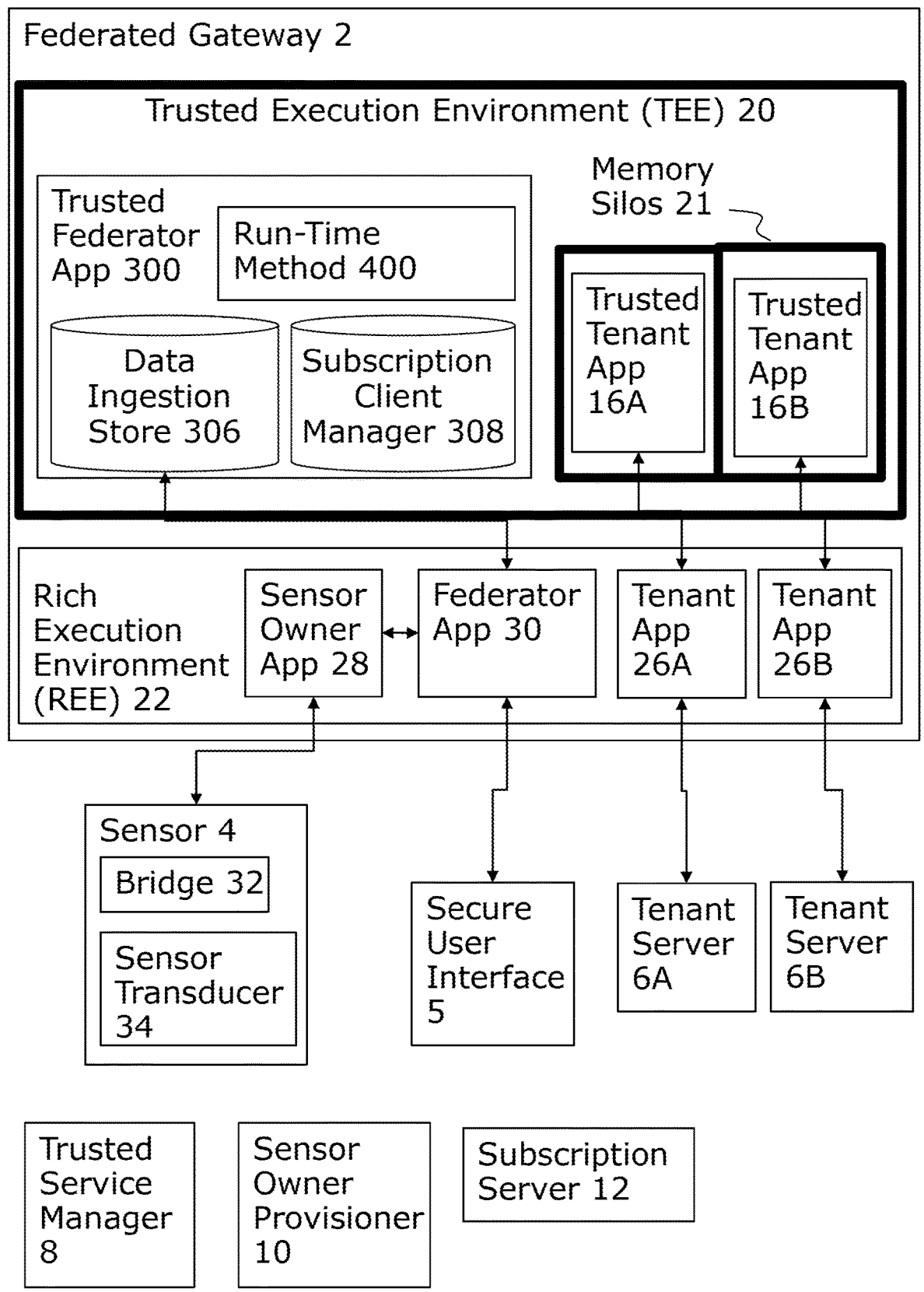
FIG. 1 is a deployment diagram for a federated gateway of a preferred embodiment.

Referring to FIG. 1, a deployment of a federated gateway 2 according to the preferred embodiment is described. The deployment comprises: federated gateway 2; sensor 4; secure user interface 5; tenant servers 6A and 6B; trusted service manager 8; sensor owner provisioner 10; and subscription server 12.

Federated gateway 2 is a standalone data processing apparatus on a circuit board in a preferred embodiment. In other embodiments federated gateway 2 is a system on a chip either standalone or combined with other hardware such as a network router or gateway.

Sensor 4 can be any type of device that produces data and can connect securely to the federated gateway 2. In the preferred embodiment, sensor 4 is a logically trusted device and comprises a bridge 32 and a sensor transducer 34. Sensor transducer 34 measures a physical thing such as: temperature, pressure, position, heart rate, or motion. Bridge 32 provides encryption and communication with the outside world including with: federated gateway 2; sensor owner provisioner 10; and sensor service server 12. Communication can be wired or wireless using any other transport protocol. Dedicated dongles or adapters can be used as part of the bridge.

Secure user interface 5 is directly connected to the trusted execution environment for communicating securely with the federated gateway user. Preferably a biometric interface is used to verify user input using fingerprint or other biometric information. A keypad and password or pin can also be used. The secure user interface 5 can only be accessed via the TEE.

Tenant servers 6A and 6B each provide a service (typically for a user) that can receive data from sensor 4 via federated gateway 2. Tenants can provide any network service that receives data from a remote sensor. Example tenants are: a health care provider that monitors data from a heart monitor; a doctor who wants to access the same data from the heart monitor; an exercise training company that wants to access the data from a set of scales and/or a security company that monitors a fire sensor.

Trusted service manager (TSM) 8 stores and distributes, for each registered tenant server, an encryption mechanism for an entity to send secure data to that tenant. For instance, if the encryption mechanism is private public key encryption then TSM 8 will store and provide a public key to federated gateway 2 for sending secure data to that tenant. Encryption mechanisms can be any type of encryption and any type of public key infrastructure. Public key encryption is used as the preferred type of encryption.

Sensor owner provisioner 10 is a server associated with the sensor that can provision a sensor with an encryption mechanism and authorizes a federated gateway to access the sensor using the encryption mechanism. The sensor owner provisioner provisions sensor 34 to store and use a symmetry key for encrypting the measured data. This symmetric key is stored in subscription server 12 along with a sensor identifier.

Subscription server 12 stores a list of sensors 4 and federated gateways 2 that can be accessed by tenant servers along with associated sensor symmetric key used for encryption. In this example, only a single sensor and federated gateway would be listed.

Federated gateway 2 provides execution environments running on a processor for securely managing sensor data and comprises: trusted execution environment (TEE) 20 and rich execution environment (REE) 22. REE 22 has external connections whereas TEE 20 has a programming interface to REE 22 but no external interface. REE 22 comprises a number of apps: sensor owner app 28; federator app 30; and in this example two tenant apps 26A and 26B. FEE 20 comprises: trusted federator app 300; and trusted tenant app 16A and 16B.

Trusted tenant app 16A and 16B run in processor memory silos 21 (represented by a thick black line around trusted tenant apps 16A and 16B) whereby they are isolated in memory from each other. This is in addition to TEE 20 running in processor memory isolated from any other non-TEE processor operations (represented by a thick black line around TEE 20).

Figure 3:
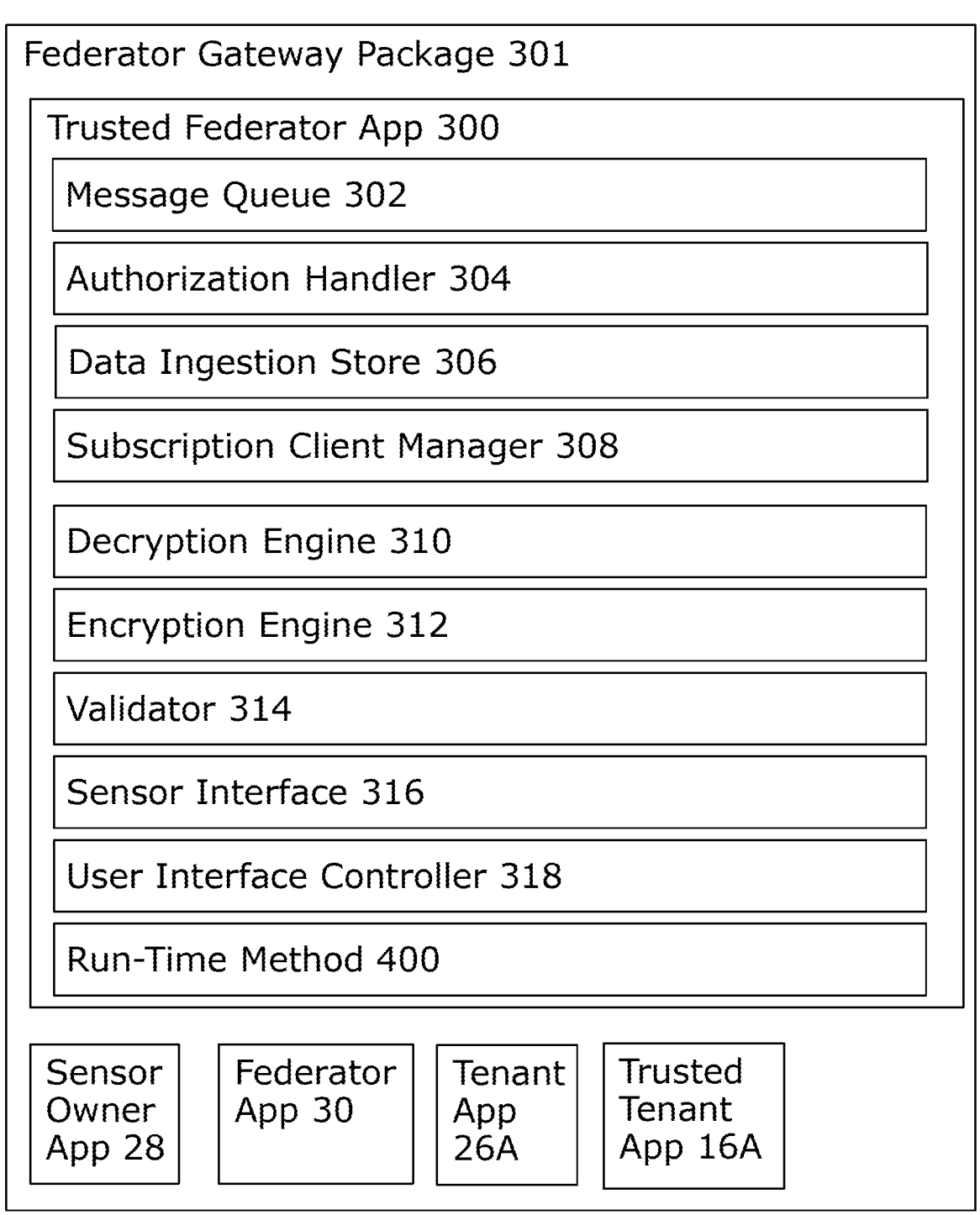
FIG. 3 is a component diagram of the preferred embodiment.

Trusted federator app 300 is described in more detail with respect to FIG. 3 but three main components shown here are: data ingestion store 306 for handling sensor data; subscription client manager 308 for handling subscriptions; and run-time method 400 for managing the operation of trusted federator app 300. These components and other components are part of trusted federator app 300 in the preferred embodiment but other embodiments are envisaged whereby one or more of these components run as individual trusted apps in TEE 20.

Sensor owner app 28 communicates with sensors and allows owners and manufacturers to provision a sensor to push data to the data ingestion store 306 in the TEE 20.

Federator app 30 provides an interface to the outside world for the trusted federator app 300 such that federator app 30 and trusted federator app 300 are partner apps. Trusted federator app 300 can only receive communication through federator app 30.

Tenant apps 26A and 26B in REE 22 provide the interface between trusted servers (6A and 6B) on the network and trusted tenant apps (16A and 16B) in TEE 20.

Figure 2:
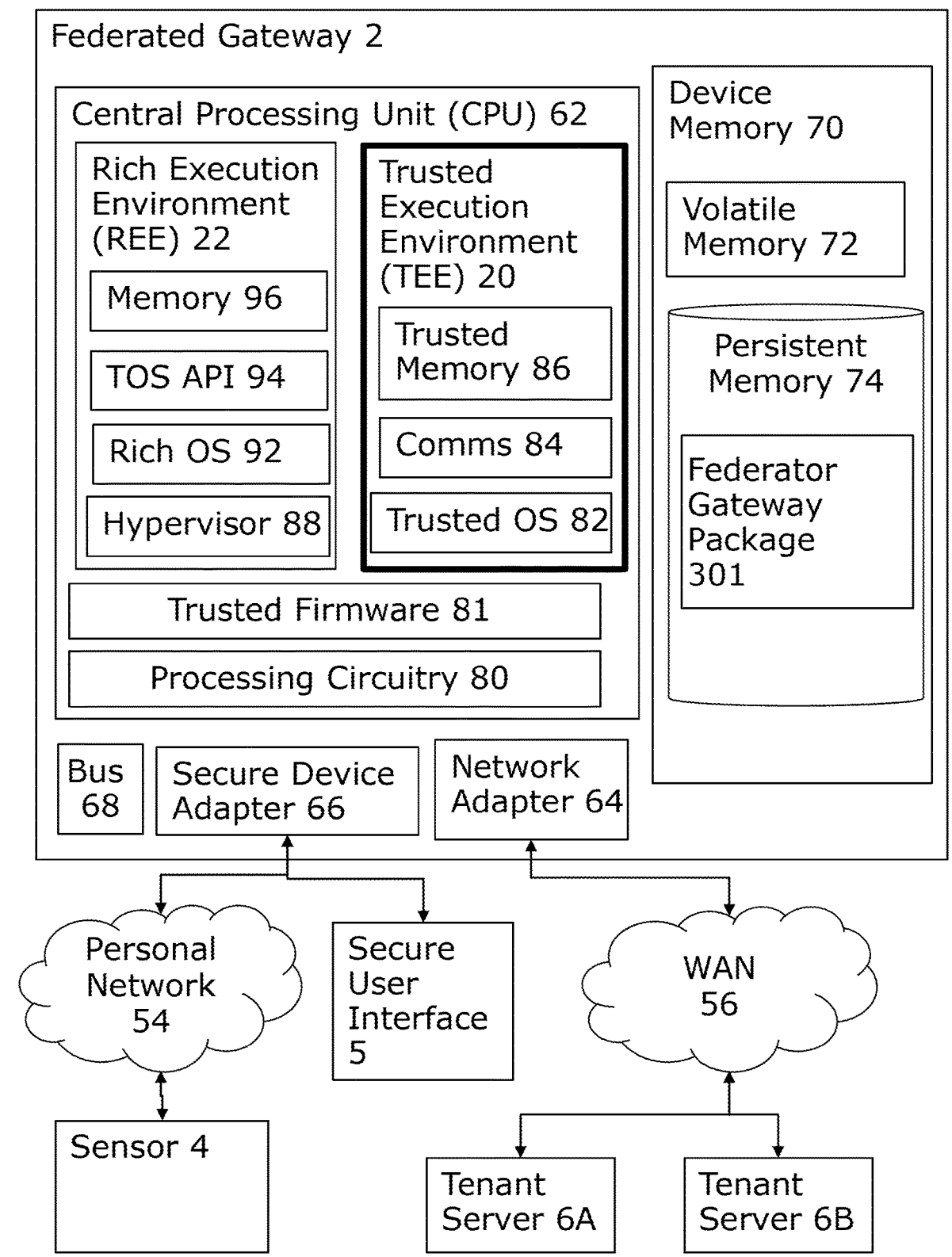
FIG. 2 is a deployment diagram for the preferred embodiment.

Referring to FIG. 2, a deployment for a computer implemented federated gateway embodiment is described. Federated gateway 2 is operational with numerous other general purpose or special purpose computing system environments or configurations. Examples of well-known computing processing systems, environments, and/or configurations that may be suitable for use with federated gateway 2 include, but are not limited to, gateways (headless or otherwise), routers (border routers or otherwise), personal computer systems, server computer systems, thin clients, thick clients, hand-held or laptop devices, multiprocessor systems, microprocessor-based systems, set top boxes, programmable consumer electronics (smart phones, smart watch, tablet), network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network of objects that can interact with a computing service.

Federated gateway 2 may be described in the general context of computer system executable instructions, such as program modules, being executed by a computer processor. Generally, program modules may include: routines; programs; objects; components; logic; and data structures that perform tasks or implement abstract data types. Federated gateway 2 may be embodied in distributed cloud computing environments where tasks are performed by remote processing devices that are linked through a communications network. In a distributed cloud computing environment, program modules may be in both local and remote computer system storage media including memory storage devices.

Federated gateway 2 is connected to a personal area network (PAN) 54 and a wide area network (WAN) 56. Personal area network (PAN) is typically a low power wireless network. Wide area network (WAN) is typically a wired network such as the Internet. Sensor 4 connects through personal network 54 to the federated gateway 2. Secure user interface 5 connects directly to the federated gateway 2 or through personal network 54. Tenant servers 6A and 6B connect to federated gateway 2 through WAN 56.

Federated gateway 2 comprises: central processing unit (CPU) 62; network adapter 64; secure device adapter 66; bus 68 and device memory 70.

CPU 62 loads machine instructions from device memory 70 and performs machine operations in response to the machine instructions. Such machine operations include: performing an operation on a value in a register (for example arithmetical or logical operations); moving a value from a register to a memory location directly and vice versa; and conditional or non-conditional branching. A typical CPU can perform many different machine operations. The machine instructions are written in a machine code language which is referred to as a low-level computer language. A computer program written in a high-level computer language (also known as source code) needs to be compiled to a machine code program (also known as object code) before it can be executed by the processor. Alternatively, a machine code program such as a virtual machine or an interpreter can interpret a high-level language in terms of machine operations.

Network adapter 64 is for enabling communication between the federated gateway 2 and network devices.

Secure device adapter 66 is for enabling secure communication between TEE 20 and sensor 4. Secure device adapter 66 is also for enabling secure communication between TEE 20 and secure user interface 5.

Bus 68 couples the main system components together including memory 70 to CPU 62. Bus 68 represents one or more of any of several types of bus structures, including a memory bus or memory controller, a peripheral bus, an accelerated graphics port, and a processor or local bus using any of a variety of bus architectures.

Device memory 70 includes computer system readable media in the form of volatile memory 72 and non-volatile or persistent memory 74. Examples of persistent memory 74 are read only memory (ROM) and erasable programmable read only memory (EPROM). Generally volatile memory is used because it is faster and generally non-volatile memory is used because it will hold the data for longer. Federated gateway 2 may further include other removable and/or non-removable, volatile and/or non-volatile computer system storage media. By way of example only, persistent memory 74 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD) or digital video disk (DVD). In such instances, each can be connected to bus 38 by one or more data media interfaces. As will be further depicted and described below, memory 70 includes a program product having modules that are configured to carry out the functions of embodiments of the invention.

CPU 62 comprises: processing circuitry 80; trusted firmware 81; TEE 20 and REE 22.

Processing circuitry 80 for processing instructions on TEE 20 when configured for TEE 20 and on REE 22 when configured for REE 22. Processing circuitry 80 comprises: fetch circuitry for fetching instructions; decode circuitry for decoding instructions; and execution circuitry for executing instructions (not shown). Data and program code stored in the FEE are accessible to processing circuitry 80 configured to operate on the FEE but such data and program code is inaccessible to the processing circuitry 80 when configured to operate in REE 22.

Trusted firmware 81 is an operating kernel program for running every other process and environment.

TEE 20 is a secure execution environment comprises secure memory for program code, data, and processing stack. TEE 20 has less functionality than REE 22 and is only accessible from the REE 22. TEE 20 is an isolated execution environment that runs in parallel with and providing security for the REE 22, TEE 20 uses processing circuitry 80 and trusted firmware 81 to protect data. Trusted applications running in a TEE 20 have access to processing circuitry 80 and device memory 70, while processing circuitry 80 isolates these from user apps running in REE 22. Trusted firmware 81 protects trusted applications contained within from each other.

REE 22 is the general execution environment that has more functionality than the TEE 20.

TEE 20 provides secure space for: trusted OS 82; comms 84; and trusted memory 86.

Trusted OS 82 is a secure operating system that only runs in TEE 20.

Comms 84 are the secure gateway to the world external to TEE 20 and normally via the REE 22.

Trusted memory 86 is for secure program code that executes only in the TEE 20.

REE 22 provides space for: hypervisor 88; rich OS 92; TOS API 94; and memory 96.

Hypervisor 88 allows more than one operating system to run at a time.

Rich OS 92 is the operating system for REE 22.

TOS API 94 is the application programming interface for the trusted operating system and provides means for communicating with the TEE 20.

Memory 96 is for applications that run in the REE 22.

Modules configured to carry out the functions of the preferred embodiment comprises: federator gateway package 301. In the preferred embodiment, the modules are loaded from the persistent memory 74, where they are stored, into CPU 62. Further program modules that support the preferred embodiment but are not shown include firmware, boot strap program, and support applications.

Referring to FIG. 3, federator gateway package 301 comprises: trusted federator app 300; federator app 30; trusted tenant app 16A; tenant app 26A; and sensor owner app 28. Each component of federator gateway package 301 is loaded into the TEE 20 or REE 22 for executing the federator gateway 2.

Trusted federator app 300 comprises: message queue 302; authorization handler 304; data ingestion store 306; subscription client manager 308; decryption engine 310; encryption engine 312; validator 314; sensor interface 316; user interface controller 318; and run-time method 400.

Message queue 302 is for receiving messages from entities outside of TEE 20.

Authorization handler 304 is for monitoring message queue 302 and validating and tracking authorizations and deauthorizations. In the preferred embodiment, sensor data will not be transmitted to a subscriber unless that subscriber has a valid and current authorization.

Data ingestion store 306 is for receiving, decrypting and storing sensor data.

Subscription client manager 308 is for managing subscriber subscriptions and for storing an encryption mechanism for each subscriber. An encryption mechanism comprises a cryptographic algorithm and key. The preferred encryption mechanism is a public private key infrastructure such as PGP and public key. Other embodiments are envisaged that use different cryptographic algorithms.

Decryption engine 310 is for decrypting the encrypted sensor data.

Encryption engine 312 is for encrypting the sensor data for each subscriber.

Validator 314 is for providing secure validation of sensor data and of requests to or from secure user interface 5.

Sensor interface 316 is for providing secure communication with sensor 4.

User interface controller 318 is for securely communicating with secure user interface 5.

Run-time method 400 is for controlling the operation of trusted federator app 400 is described in more detail below.

Figure 4:
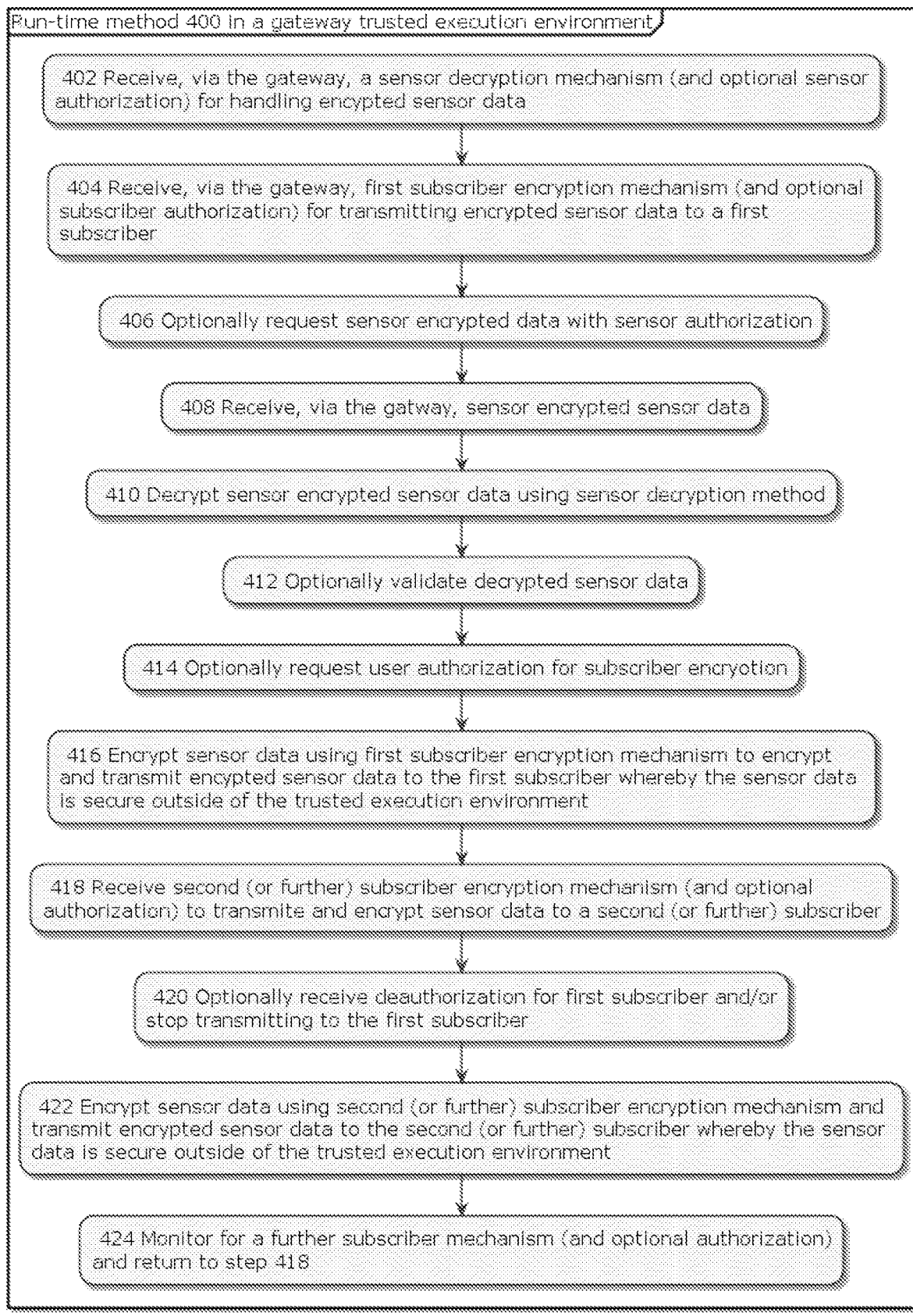
FIG. 4 is a method diagram of the preferred embodiment.

Referring to FIG. 4, a run-time method 400 comprises logical process steps 402 to 424 performed by federator gateway 2 in TEE 20.

Step 402 is for receiving, via message queue 302, a sensor decryption mechanism for handling encrypted sensor data. In the preferred embodiment, a sensor authorization signal is sent separately but in other embodiments receipt of the sensor decryption mechanism can be used as authorization. This is stored in data ingestion store 306.

Step 404 is for receiving, via message queue 302, a first subscriber encryption mechanism for transmitting encrypted sensor data to a first subscriber. In the preferred embodiment, a first subscriber authorization signal is sent separately but in other embodiments receipt of the first subscriber encryption mechanism can be treated as authorization. This is stored with subscription client manager 308.

Step 406 is an optional step in the preferred embodiment whereby the sensor encrypted data is requested from the sensor when the sensor authorization is received. However, in other embodiments sensor data may be requested by other entities without needing a request from the gateway or even not requested at all if the sensor is broadcasting data.

Step 408 is for receiving, via message queue 302, encrypted sensor data.

Step 410 is for decrypting sensor encrypted sensor data using sensor decryption method and decryption engine 310.

Step 412 is an optional step for validating decrypted sensor data. One preferred validation method comprises a user authorizing a secure request for decrypting the sensor data by presenting a fingerprint or password to secure user interface 316. Other non-user validation methods can be implemented through the trusted federator application.

Step 414 is an optional step for requesting and confirming user authorization for subscriber encryption through the secure user interface 316. One preferred confirmation method comprises a user confirming by presenting a fingerprint or password to secure user interface 316.

Step 416 is for encrypting sensor data using the first subscriber encryption mechanism (using encryption engine 312) and for transmitting the encrypted sensor data to the first subscriber (using subscription client manager 308) whereby the sensor data is secure outside of the trusted execution environment.

Step 418 is for receiving a second subscriber encryption mechanism via message queue 302 for transmitting and encrypting sensor data for a second subscriber. This step is also responsible for receiving further subscriber encryption mechanisms for transmitting and encrypting sensor data for further subscribers. In the preferred embodiment authorization is sent separately.

Step 420 is an optional step for stopping transmission of the encrypted sensor data to the first subscriber (optionally after receiving deauthorization for first subscriber) depending on how trusted federator app 300 is configured. One configuration is not to stop sending of encrypted sensor data to a first subscriber so that many subscribers can simultaneously receive the data (for example when many healthcare services wish to receive the sensor data). Another configuration is locked to send sensor data to one subscriber at time (for example when a healthcare service has exclusive access to the sensor data). Another configuration is to allow flexible authorization and deauthorization of subscribers.

Step 422 is for encrypting sensor data using a second subscriber encryption mechanism (using encryption engine 312) and for transmitting encrypted sensor data (using client manager 308) to the second subscriber whereby the sensor data cannot be read by federated gateway 2 outside of TEE 20. This step is also responsible for encrypting and transmitting sensor data for further subscribers.

Step 424 is for monitoring for a further subscriber mechanism (and optional authorization) and on receipt returning to step 418. This is the last step in run-time method 400.

Figure 5:
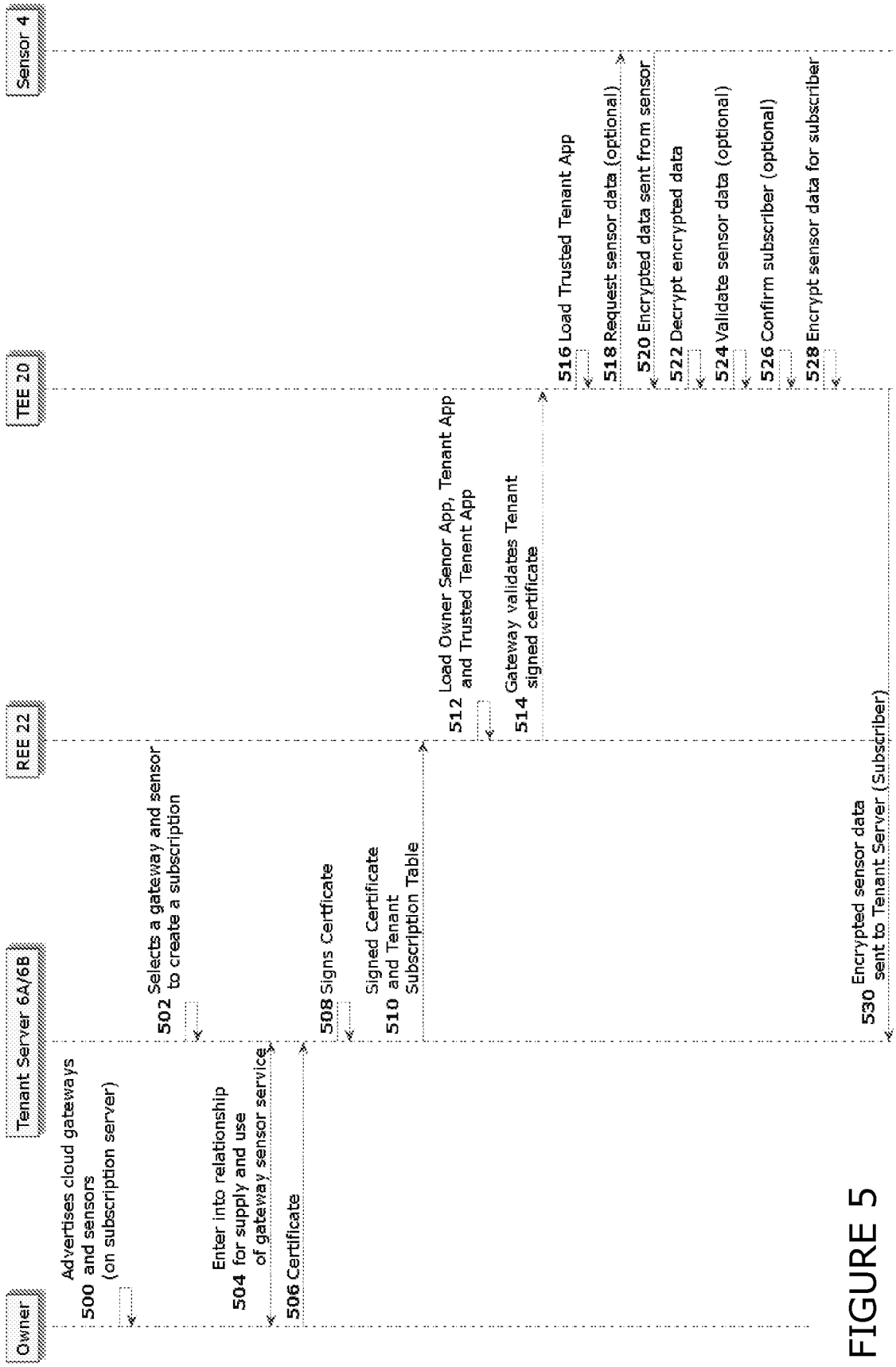
FIG. 5 is a sequence diagram showing interaction sequences between a federated gateway and other actors for the example.

Referring to FIG. 5, a sequence of steps 502 to 526 showing interaction sequences between the federated gateway and other actors is described.

At step 500, a sensor owner (for example the original manufacturer, a tenant and/or a network provider) advertises cloud gateways and sensors on a subscription server. In this example, there is only one sensor 4 and one cloud gateway.

At step 502, a tenant server 6A (or tenant sever 6B) selects the gateway and sensor coupling to create a subscription.

At step 504, the owner enters into relationship for supply and use of the gateway sensor coupling.

At step 506, the owner sends an owner certificate to the tenant server 6A/6B so that the tenant server can prove authentication of the relationship.

At step 508 the tenant server 6A/6B signs the certificate.

At 510, the tenant server 6A/6B sends to REE 22 the signed certificate and tenant subscription table. The tenant subscription table contains: a tenant app; a corresponding tenant trusted app; and a sensor owner app. All these apps are necessary for the subscription.

At step 512, REE 22 loads the tenant app and the sensor owner app.

At step 514, REE 22 validates the tenant signed certificate and forwards it to the TEE 20.

At step 516, TEE 20 loads the trusted tenant app.

At step 518, TEE 20 requests sensor data from the sensor 4 (not necessary if sensor is already broadcasting sensor data).

At step 520, encrypted data is received from the sensor.

At step 522, the encrypted data is decrypted in TEE 20.

At step 524, optionally the sensor data is validated by TEE 20.

At step 526, optionally, encryption for the subscriber is confirmed by the user via the secure user interface.

At step 528, the sensor data is re-encrypted for the subscriber's tenant server.

At step 530, the encrypted sensor data is sent to tenant server and this is the end of the sequence diagram.

Figure 6:
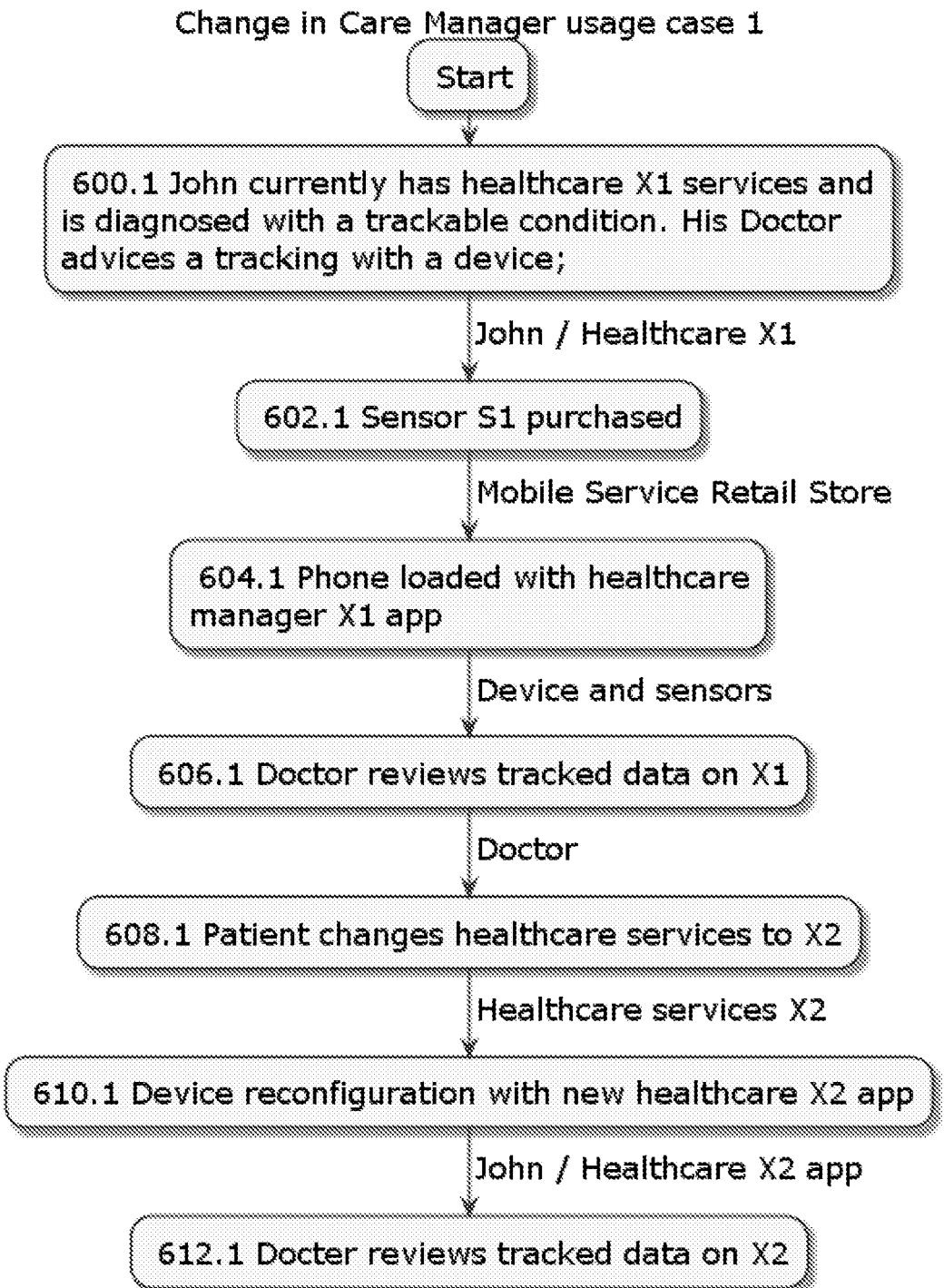
FIG. 6 is a schematic usage case of the preferred embodiment.

Referring to FIG. 6, schematic use case 1 for changing care manager is described comprising steps 600.1 to 612.1.

Step 600.1, John is employed by company C1, company C1 uses healthcare X1 services. After seeing his doctor D1, John is diagnosed with a condition that is trackable using an electronic sensor that monitors and records his heart rate. Healthcare X1 services provide the monitoring and recommends buying a sensor S1.

Step 602.1, John purchases sensor S1 from a mobile phone retail store.

Step 604.1, John's phone is to be the federated gateway and X1's health monitoring package 301 (comprising a federator apps 30/300, X1 tenant apps 16A/26A and sensor owner app) is installed. X1's health monitoring package 301 sets up the phone whereby the apps are loaded into FEE 20 and REE 22 in the phone processor. Sensor app connects to sensor and federator. X1 tenant apps connect to federator. Monitoring commences and data is federated to trusted tenant app 16A.

Step 606.1, John's doctor reviews tracked data using a doctor's interface to X1's health monitoring trusted app data on the Internet.

Step 608.1, John changes employer and the new employer uses X2 healthcare services. New healthcare tenant apps are needed. The federator gateway app needs reconfiguring for the new tenant apps.

Step 610.1, the federator gateway is reconfiguration with X2 trusted tenant app and tenant app. In usage case 1 access to the sensor is exclusive so that X1's healthcare app is switched off or deleted.

Step 612.1, Doctor D1 reviews the tracked data for condition from the newly configured X2 trusted tenant app and tenant app.

Further usage cases are described which are developed from usage case 1. In these usage cases, principles are apparent: a user and user delegates own all the user data; the usage case examples can be implemented with small user intervention except for when consent requires a user response; primary consent is for patient sensor originated data; and secondary consent is for data in the cloud.

Use case 2 is for the addition of a care provider is described using steps 602.2 to 612.2 (not shown).

Steps 602.2 to 606.2 are the same as respective steps 602.1 to 606.1.

Step 608.2, a further healthcare service X3 is recommended (for example a weight loss program).

Step 610.2, the federated gateway 2 is loaded and reconfigured with new healthcare X3 trusted tenant app/tenant app under the control of the sensor owner provisioner 10. X3's trusted tenant app and tenant app are loaded and connected to federator gateway in addition to healthcare app X1.

Step 612.2, Doctor D1 reviews the tracked data for condition from using a doctor's interface to X1's health monitoring app data on the Internet. A weight loss coach requests access to a coach's interface on X3's health monitoring app data on the Internet. John confirms access through the secure user interface.

Usage case 3 is a change in care profile and is described using steps 602.3 to 614.3 (not shown).

Steps 602.3 to 606.3 are the same as respective steps 602.1 to 606.1.

Step 608.3, a further healthcare professional Doctor D2 is called in by Doctor D1. Doctor D2 makes a recommendation to: increase the frequency of tracking the heartrate; to start measuring and tracking blood sugar level using S1; and to measure skin resistance using a new sensor S2.

Step 610.3, a new sensor S2 is provided to John. Sensor S1 and S2 are configured via federated gateway 2 under the control of the sensor owner provisioner 10 (in this case the phone company) to provide the new measurements. In the preferred embodiment, federated gateway 2 is deployed in a phone device with a user interface and is enabled to requested permission from the phone owner for reconfiguration of the sensors. Furthermore, federated gateway 2 is enabled to requested permission from the phone owner when a new access right request is made to access sensor data on the tenant server. In both cases John approves the access using the secure user interface.

Step 612.3, Doctor 2 requests doctor access using a doctor interface to X1's health monitoring tenant server app. The request is sent through to the trusted tenant app for the user to approve. John approves the request on his phone using finger print authorization and the approval is sent back to the tenant server.

Step 614.3, both Doctor D1 and Doctor D2 can review the tracked data from their respective interfaces to X1's health monitoring tenant server app accessible from the Internet.

Usage case 4 is for a company payor to reward the employee (John) and is described using steps 602.4 to 614.4.

Steps 602.4 to 606.4 are the same as respective steps 602.1 to 606.1.

Step 608.4, employer C1 wants to reward John for adherence to a healthy lifestyle and to do so requires an audit of the health record. Such an audit is a summary of the sensor data to show an overview of performance and is sensitive information that requires approval from John before release. Employer C1 accesses the tenant server through an employer interface that allows a request for an audit.

Step 610.4, the request is sent from the tenant server through to the trusted tenant app for approval by John.

Step 612.4, John approves the request on his phone using finger print authorization and the approval is sent back to the tenant server.

Step 614.4, Employer C1 can review the audit from interfaces to X1's health monitoring tenant server app accessible from the Internet. The tenant server app can also accept reward information and notify John via the trusted tenant app.

Usage case 5 is for a change in doctor and healthcare service provider. and is described using steps 602.5 to 612.5.

Steps 602.5 to 606.5 are the same as respective steps 602.1 to 606.1.

Step 608.5, sensor owner provisioner 10 (the phone company) requests the federated gateway 2 to download a new set of tenant apps including the trusted tenant app for a new healthcare provider X4. The sensor owner provisioner 10 also requests the federated gateway 2 to connect sensor 5 data to the new X4 trusted tenant app. The requests need to be authorized by the user John.

Step 610.5, the requests are sent to the trusted federator app for approval by employee John.

Step 612.5, John approves the requests on his phone using finger print authorization.

Step 614.5, Doctor D3 requests doctor access using a doctor interface to X4's health monitoring tenant server app. The request is sent through to the trusted tenant app for the user to approve. John approves the request on his phone using finger print authorization and the approval is sent back to the tenant server.

Step 616.5, Doctor D3 can review the tracked data from his interfaces to X3's health monitoring tenant server app accessible from the Internet.

Usage case 6 is for post-operative care comprising steps 602.6 to 612.6.

Step 602.6, John is given a sensor to wear in hospital. A network enabled sensor sends its data to the hospital electronic medical records (EMR) system through a federated gateway application and hospital trusted tenant application on John's phone.

Step 604.6 John is discharged. The hospital sends a request message to the trusted tenant application asking to continue to share the same data with hospital EMR over John's home network post-discharge. John approves the request on his phone using finger print authorization.

Step 606.6, after 15 days, a new consent request is received for John's GP Doctor D1 to access the data. John accepts through the secure user interface.

Step 608.6, the data is accessed by the GP and the hospital with John's consent. The doctor or hospital can send a notification to John via the federated gateway 2 to verify he can come in for an urgent consultation. Such a verification would be made through secure user interface 5.

Step 610.6, after some time, both the GP and hospital notify John that they no longer access the data and request that he approves this through the secure user interface. The sensor data is still being measured and John can authorize a private company to monitor it for problems.

Usage case 7 is for multiple users for one federated gateway. Such a usage case has a federated gateway connected to central network router accessible by multiple users. In the simplest example a secure user interface 5 on the federated gateway can authenticate each user. However, a more sophisticated example uses secure user interfaces on each user's personal device such that a fingerprint interface on a user's phone is securely connected to the trusted federator app 300.

Usage case 8 envisages a user buying off the shelf sensors or using pre-own sensors. In this case, the user is the provisioner and has to configure the sensor using a sensor owner provisioner.

In summary according to a first aspect of the invention there is described a data processing gateway comprising: data processing circuitry for performing data processing operations in response to program code; a first execution environment (FEE) for storing data and program code; and a second execution environment (SEE) for storing data and program code, wherein data and program code stored in the FEE when accessible to the data processing circuitry configured to operate in the FEE is inaccessible to the data processing circuitry when configured to operate in the SEE, the FEE comprising: a data ingestion store program code for receiving a device decryption mechanism into the FEE to decrypt encrypted device data, the data ingestion store further for receiving encrypted device data into the FEE and for decrypting the encrypted device data using the device decryption mechanism; and a subscriber client manager program code for receiving a first subscriber encryption mechanism into the FEE, and further for encrypting device data using the first subscriber encryption mechanism and further for transmitting encrypted device to a first subscriber externally of the data processing gateway whereby the device data is secure outside of the FEE.

A trusted execution environment (TEE) according to the preferred embodiment is an example of a first execution environment (FEE) above. Likewise, a rich execution environment (REE) is an example of a second execution environment (SEE) above. Preferably the subscriber client manager is further for receiving a second subscriber encryption mechanism, and further for encrypting the device data using the second subscriber encryption mechanism, and further for transmitting the second subscriber encrypted device data to the second subscriber externally of the data processing gateway whereby the device data is secure outside of the FEE.

More preferably the device is a sensor making physical measurements but the embodiments are not restricted to sensors.

In another embodiment, a device comprises: a sensor making physical measurements and a data processing gateway according to a preferred embodiment, wherein the physical measurements are encrypted for device data and input to the data processing gateway. Here the sensor and federated gateway are part of the same device and can be on the same system on a chip.

In another embodiment, a network server comprises a first tenant server and a data processing gateway according to preferred embodiment 1 wherein the data processing gateway encrypts data for the first tenant server and further encrypts data for a second and more tenant servers than are not located in the network server.

Even more preferably the FEE of the preferred embodiment comprises a secure user interface for requesting and receiving user authorization before encrypting or decrypting device data.

According to another aspect of the embodiments there is provided a method of data processing in a first execution environment (FEE) in a data processing gateway, the data processing gateway comprising: data processing circuitry for performing the data processing in response to program code; the first execution environment (FEE) for storing data and the program code; and a second execution environment (SEE) for storing data and program code, wherein data and program code stored in the FEE when accessible to the data processing circuitry configured to operate in the FEE is inaccessible to the data processing circuitry when configured to operate in the SEE, the method comprising: receiving a device decryption mechanism into the FEE for decrypting encrypted device data; receiving a first subscriber encryption mechanism into the FEE for transmitting encrypted device data to a first subscriber; receiving encrypted device data into the FEE; decrypting encrypted device data using the device decryption mechanism; encrypting device data using first subscriber encryption mechanism; and transmitting first subscriber encrypted device data to the first subscriber whereby the device data is secure outside of the FEE.

Preferably the method further comprises: receiving a second subscriber encryption mechanism for transmitting encrypted device data to a second subscriber; encrypting device data using second subscriber encryption mechanism; and transmitting second subscriber encrypted device data to the second subscriber whereby the device data is secure outside of the secure execution environment.

More preferably the method further comprises receiving authorization from a user before encrypting or decrypting device data.

Even more preferably the method further comprises requesting authorization from a user before encrypting or decrypting device data.

Advantageously the method further comprises validating decrypted device data prior to transmitting to subscribers.

More advantageously the method further comprises receiving a deauthorization signal for first subscriber and halting transmission of encrypted device data to the first subscriber.

Yet more advantageously the method further comprises halting transmission of encrypted device data to the first subscriber on receipt of the second subscriber encryption mechanism.

Still more advantageously the method further comprises wherein receipt of a subscriber decryption mechanism is authorization to decrypt and transmit to the subscriber.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

The invention claimed is:

1. A data processing gateway comprising:
data processing circuitry to perform data processing operations in response to program code;
a first execution environment (FEE) comprising a trusted memory to store data and the program code; and
a second execution environment (SEE) comprising a memory to store data and the program code,
wherein the data and the program code stored in the FEE is accessible to the data processing circuitry when the data processing circuitry is configured to operate in the FEE and the data and the program code stored in the FEE is inaccessible to the data processing circuitry when the data processing circuitry is configured to operate in the SEE,
wherein the FEE comprises:
a data ingestion store to receive, from a first remote sensor device external to the data processing gateway, via the SEE, encrypted sensor device data, wherein the encrypted sensor device data was encrypted by the first remote sensor device using a sensor device encryption mechanism, and to receive, from a second remote device external to the data processing gateway, via the SEE, a sensor device data decryption mechanism to decrypt the encrypted sensor device data;
a decryption engine to decrypt the received encrypted sensor device data within the FEE using the sensor device decryption mechanism to generate decrypted sensor device data;
a validator to validate the decrypted sensor device data before transmitting the decrypted sensor device data to a subscriber client manager by receiving a user authorization signal, wherein the user authorization signal is received before decrypting the encrypted sensor device data or encrypting the decrypted sensor device data;
wherein the subscriber client manager is configured to receive, via the SEE, a first subscriber encryption mechanism different than the sensor device encryption mechanism;
an encryption engine to encrypt in the FEE the decrypted sensor device data using the first subscriber encryption mechanism to generate first subscriber encrypted sensor device data; and
wherein the subscriber client manager in the FEE is configured to transmit, via the SEE, the first subscriber encrypted sensor device data to a first subscriber located externally from the data processing gateway, wherein the transmitted first subscriber encrypted sensor device data is secure outside of the FEE;
wherein the data processing circuitry is configured to halt transmission of the first subscriber encrypted sensor device data to the first subscriber based on a receipt of a second subscriber encryption mechanism.

2. The data processing gateway according to claim 1, wherein the subscriber client manager is further to receive the second subscriber encryption mechanism into the FEE;
the encryption engine is configured to encrypt the decrypted device data using the second subscriber encryption mechanism; and
the subscriber client manager is configured to transmit the second subscriber encrypted device data to a second subscriber externally of the data processing gateway, where the transmitted second subscriber encrypted device data is secure outside of the FEE.

3. The data processing gateway according to claim 1, wherein a sensor device is providing the encrypted sensor device data from physical measurements.

4. The data processing gateway according to claim 1, wherein the FEE comprises a secure user interface to request and receive user authorization before decrypting the encrypted sensor device data or encrypting the decrypted sensor device data.

5. A data processing apparatus, comprising:
a device to provide encrypted sensor device data; and
a data processing gateway comprising:
data processing circuitry to perform data processing operations in response to program code;
a first execution environment (FEE) comprising a trusted memory to store data and the program code; and
a second execution environment (SEE) comprising a trusted memory to store data and the program code,
wherein the data and the program code stored in the FEE is accessible to the data processing circuitry when the data processing circuitry is configured to operate in the FEE and the data and the program code stored in the FEE is inaccessible to the data processing circuitry when the data processing circuitry is configured to operate in the SEE, wherein the FEE comprises:
- a data ingestion store to receive, from a first remote sensor device, via the SEE, encrypted sensor device data, wherein the encrypted sensor device data is encrypted by the first remote sensor device, using a device encryption mechanism and to receive, from a second remote device, via the SEE, a sensor device data decryption mechanism to decrypt the encrypted sensor device data;
- a decryption engine to decrypt the received encrypted sensor device data within the FEE using the sensor device decryption mechanism to generate decrypted sensor device data;
- a validator to validate the decrypted sensor device data before transmitting the decrypted sensor device data to a subscriber client manager by receiving a user authorization signal, wherein the user authorization signal is received before decrypting the encrypted sensor device data or encrypting the decrypted sensor device data;
- wherein the subscriber client manager is configured to receive, via the SEE, a first subscriber encryption mechanism different than the sensor device encryption mechanism;
- an encryption engine to encrypt in the FEE the decrypted sensor device data using the first subscriber encryption mechanism to generate first subscriber encrypted sensor device data; and
- wherein the subscriber client manager in the FEE is configured to transmit, via the SEE, the first subscriber encrypted sensor device data to a first subscriber located externally from the data processing gateway, where the transmitted first subscriber encrypted sensor device data is secure outside of the FEE;
- wherein the data processing circuitry is configured to halt transmission of the first subscriber encrypted sensor device data to the first subscriber based on a receipt of a second subscriber encryption mechanism.

6. The data processing apparatus of claim 5, where the data processing apparatus is on a chip.

7. A method of data processing in a first execution environment (FEE) in a data processing gateway, the data processing gateway comprising: data processing circuitry that performs the data processing in response to program code; the first execution environment (FEE) comprising a trusted memory to store data and the program code; and a second execution environment (SEE) comprising a memory that stores data and program code, wherein the data and the program code stored in the FEE is accessible to the data processing circuitry when the data processing circuitry operates in the FEE and the data and the program code stored in the FEE is inaccessible to the data processing circuitry when the data processing circuitry operates in the SEE, the method comprising:
- receiving encrypted sensor device data into the FEE from a first remote sensor device external to the data processing gateway, via the SEE, where the encrypted sensor device data was encrypted at the first remote sensor device using a sensor device encryption mechanism;
- receiving, from a second remote device external to the data processing gateway, via the SEE, a sensor device data decryption mechanism into the FEE for decrypting the encrypted sensor device data;
- receiving a first subscriber encryption mechanism different than the sensor device encryption mechanism into the FEE via the SEE for encrypting the decrypted sensor device data using the first subscriber encryption mechanism to generate first subscriber encrypted sensor device data and for transmitting via the SEE the first subscriber encrypted sensor device data to a first subscriber located externally from the data processing gateway;
- decrypting the encrypted sensor device data using the sensor device data decryption mechanism to generate decrypted sensor device data;
- validating the decrypted sensor device data before transmitting the decrypted sensor device data to a subscriber client manager by receiving a user authorization signal, wherein the user authorization signal is received before decrypting the encrypted sensor device data or encrypting the decrypted sensor device data;
- encrypting in the FEE the decrypted sensor device data using the first subscriber encryption mechanism;
- transmitting the first subscriber encrypted sensor device data to a first subscriber external to the data processing gateway, wherein the transmitted first subscriber encrypted sensor device data is secure outside of the FEE; and
- halting transmission of the first subscriber encrypted sensor device data to the first subscriber based on a receipt of a second subscriber encryption mechanism.

8. The method according to claim 7, further comprising:
- receiving the second subscriber encryption mechanism into the FEE for encrypting the decrypted device data using the second subscriber encryption mechanism and for transmitting the second subscriber encrypted sensor device data to a second subscriber;
- encrypting the decrypted device data using the second subscriber encryption mechanism; and
- transmitting the second subscriber encrypted sensor device data to the second subscriber whereby the transmitted second subscriber encrypted sensor device data is secure outside of the secure execution environment.

9. The method according to claim 7, further comprising requesting authorization from the user before decrypting the encrypted sensor device data or encrypting the decrypted sensor device data.

10. The method according to claim 7, further comprising receiving a deauthorization signal for the first subscriber and halting transmission of the first subscriber encrypted sensor device data to the first subscriber.

11. The method according to claim 7, wherein receipt of a subscriber decryption mechanism is authorization to decrypt and transmit to the first subscriber.

12. The method according to claim 7, wherein a discrete authorization signal is required in addition to a subscriber decryption mechanism before the encrypted sensor device data can be decrypted and transmitted to the first subscriber.

13. The method according to claim 7, further comprising:
- monitoring for a further subscriber encryption mechanism;
- encrypting the decrypted sensor device data using the further subscriber encryption mechanism; and
- transmitting the further subscriber encrypted sensor device data to a further subscriber.

14. The method according to claim 7, wherein the first execution environment is one or more of: a trusted execution environment; an execution domain; and/or an execution world.

* * * * *